United States Patent
Boguhn et al.

(10) Patent No.: US 9,228,904 B2
(45) Date of Patent: Jan. 5, 2016

(54) METHOD FOR MANUFACTURING A MEASURING APPARATUS AND METHOD FOR CASTING IN A MOLD

(75) Inventors: Dirk Boguhn, Munich (DE); Torsten Iselt, Kempten (DE)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 275 days.

(21) Appl. No.: 13/119,452

(22) PCT Filed: Aug. 6, 2009

(86) PCT No.: PCT/EP2009/060175
§ 371 (c)(1),
(2), (4) Date: Mar. 17, 2011

(87) PCT Pub. No.: WO2010/034559
PCT Pub. Date: Apr. 1, 2010

(65) Prior Publication Data
US 2011/0169184 A1    Jul. 14, 2011

(30) Foreign Application Priority Data
Sep. 23, 2008  (DE) .......................... 10 2008 048 583

(51) Int. Cl.
*B28B 1/087* (2006.01)
*G01K 1/08* (2006.01)

(52) U.S. Cl.
CPC ........................................ *G01K 1/08* (2013.01)

(58) Field of Classification Search
CPC combination set(s) only.
See application file for complete search history.

(56) References Cited

U.S. PATENT DOCUMENTS

| 3,422,170 | A | * | 1/1969 | Gardner et al. | 264/3.1 |
| 3,434,207 | A | | 3/1969 | Frachon | |
| 3,732,095 | A | * | 5/1973 | Klein | 419/40 |
| 4,490,045 | A | | 12/1984 | Hudelmaier | |
| 5,481,240 | A | | 1/1996 | Fukaya et al. | |
| 6,501,366 | B2 | | 12/2002 | Takahashi et al. | |
| 2002/0084884 | A1 | * | 7/2002 | Takahashi et al. | 338/25 |

(Continued)

FOREIGN PATENT DOCUMENTS

| CN | 101125362 | 2/2008 |
| DE | 1 101 473 | 3/1961 |
| DE | 3101468 | 8/1982 |

(Continued)

OTHER PUBLICATIONS

German Search Report.

(Continued)

*Primary Examiner* — James Sanders
(74) *Attorney, Agent, or Firm* — Bacon & Thomas, PLLC

(57) ABSTRACT

Method for manufacturing a measuring apparatus for determining and/or monitoring at least one process variable. At least one sensor element is inserted into an at least partially pot-shaped mold, and the mold is at least partially filled with a casting material composed at least of a first component and a second component. The mold is filled with the casting material, at least partially, with at least the following steps at least one predeterminable amount of the first component of the casting material is charged into the mold; at least one predeterminable amount of the second component of the casting material is charged into the mold; and the mold is vibrated and/or caused to oscillate with a predeterminable frequency. Furthermore, a method for filling an at least partially pot-shaped mold is disclosed.

8 Claims, 1 Drawing Sheet

(56) References Cited

U.S. PATENT DOCUMENTS

2004/0179423 A1    9/2004   Asami
2007/0104247 A1    5/2007   Takahashi

FOREIGN PATENT DOCUMENTS

| | | |
|---|---|---|
| DE | 202004006582 | 9/2004 |
| DE | 10 2004 021 634 A1 | 11/2004 |
| DE | 10 2004 007 906 A1 | 9/2005 |
| DE | 10 2006 034 248 B3 | 10/2007 |
| EP | 1 881 309 A1 | 1/2008 |
| GB | 1 103 390 | 2/1968 |
| WO | WO 9700167 A1 * | 1/1997 ................ B28B 1/52 |

OTHER PUBLICATIONS

International Search Report.
English translation of IPR, Apr. 7, 2011, WIPO, Geneva.
Search Report, Oct. 16, 2012, EPO, The Netherlands.

* cited by examiner

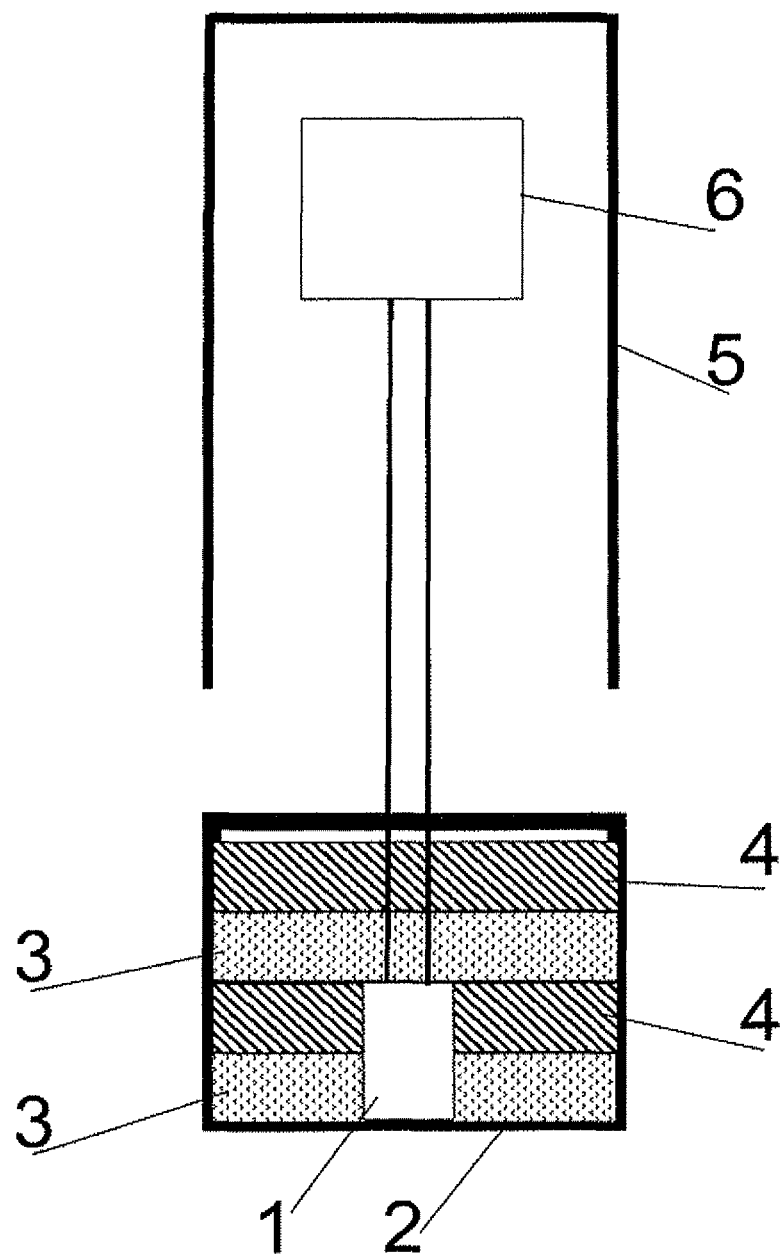

METHOD FOR MANUFACTURING A MEASURING APPARATUS AND METHOD FOR CASTING IN A MOLD

TECHNICAL FIELD

The invention relates to a method for manufacturing a measuring apparatus for determining and/or monitoring at least one process variable, wherein at least one sensor element is inserted into an at least partially pot-shaped mold and wherein the mold is at least partially filled with a casting material composed at least of a first component and a second component. Furthermore, the invention relates to a method for casting in an at least partially pot-shaped mold, wherein the mold at is least partially pot-shaped mold, wherein the mold at is least partially filled with a casting material composed at least of a first component and a second component.

BACKGROUND DISCUSSION

In the manufacture of temperature measuring devices, there is, for example, the long-used technology, wherein temperature sensors, especially platinum resistance sensors in thin film embodiment, are encapsulated, or embedded, in, given cases, pure ceramic powders (MgO,Al2O3).In such cases, most often a number of goals are pursued: on the one hand, the, in general, scarcely rugged sensor elements should be secured. On the other hand, the connection wires of the sensor elements should be electrically insulated relative to one another, and also from a metal housing, for example a thermometer jacket, for service at high temperatures of 600° C. or more. Furthermore, impurities and/or chemical changes of the sensor element ( especially temperature-sensitive, platinum, thin film sensors) should be excluded for as long a time as possible. The achievement of these goals is most often limited in practice.

Better results achieved when, instead of a more or less compressed ceramic powder, a ceramic casting which hardens by curing is used, and the sensor element is securely embedded and encapsulated in a compact, comparatively fixed, ceramic block. As a mold, into which the ceramic casting and the sensor element are inserted and cured, options include either small, fitted, ceramic parts (e.g. small tubes) or even a steel tip, or casing of the measuring device, or of the thermometer itself, into which the sensor element to is installed. In such a case, the volume of casting material to be charged is comparatively small, e.g. only a few 100 mm$^3$.

Most often for such ceramic castings, greater amounts of fine powder is mixed separately with water or other liquid in a fixed mass ratio and then charged into the mold, where setting and hardening slowly occur. However, a batch of ceramic castings, after mixing, is, like plaster for example, capable of being cast and dispensed for only a relatively short time (a few minutes). Thereafter, solidification sets in, so that this casting material is scarcely still conveyable and can no longer be metered with established methods. This is the more so true, when small fill volumes are involved. A casting apparatus applied for this casting would be continually complex to clean, and a large part of the mixed ceramic casting material would be unusable.

SUMMARY OF THE INVENTION

Consequently, an object of the invention is to provide a method for the reproducible mixing of a casting material and its charging in comparatively small amounts.

The invention solves this object by a method for manufacturing a measuring apparatus for determining and/or monitoring at least one process variable, wherein at least one sensor element is inserted into an at least partially pot-shaped mold and wherein the mold is at least partially filled with a casting material composed at least of a first component and a second component. In such a case, the method of the invention provides, that the mold is filled with the casting material, at least partially with steps as follows: at least one predeterminable amount of the first component of the casting material is charged into the mold; at least one predeterminable amount of the second component of the casting material is charged into the mold; and the mold is vibrated and/or caused to oscillate with a predeterminable frequency. For example, the mold can be a steel casing. The process variable is, for example, temperature, humidity, flow, viscosity or fill level. By the alternating introduction of both components, the fill quantity or height of the casting material can be reached more exactly. The method is especially advantageous in the case of casting materials, which have only a very short pot life and which, because of a pasty consistency, are scarcely dispensable, e.g. as in the case of ceramic casting materials. The measuring apparatus is especially a measuring device of process- and automation technology. The process variable is, for example, temperature, fill level, density, viscosity or flow.

According to the invention, the mixed casting material is thus directly poured into the volume which is to be filled by casting. An example is a cylindrical steel casing which is closed on one end, has an outer diameter of 6 mm and a height of 15 mm, and is installed as the tip of a thermometer measuring insert.

In different embodiments, the components are charged into the mold either at essentially the same time, or alternatingly in defined amounts or proportions In such a case, one component can be liquid and one powdered. The components are preferably uniformly charged. In such a case, the mold is, for example, continuously vibrated, i.e. it is subjected to vibrations of a suitably selected frequency. By this vibration, the necessary mixing of both components and also a relatively high densification of the ceramic slip are achieved. For example, air bubbles, which in the case of the conventional mechanical stirring, as a rule, remain in the casting material and lead to an undesired porosity after hardening, are caused to rise and outgas by the vibration.

In an embodiment, the components are charged in a plurality of layers, i.e. in at least two portions in each case. In an embodiment, the two components are charged beginning with the liquid component. In such a case, in an embodiment, the mold, respectively, the steel casing, is subjected to a continuous vibration. In an embodiment, the two components are charged, each, to a quarter of the total fill amount. Comparatively thin layer thicknesses of the components are especially desired, so that such a "sandwich construction" permits a sufficiently good mixing of both components exclusively through vibration. The number of layer portions also depends, in such a case, on the total height to be achieved in the volume to be cast. However, a low number of layers, e.g. three to five, are most often sufficient. In principle, these layer portions can be implemented as thin as possible. This is constrained by the measurement accuracy of the dosing systems for the powder and liquid casting material components.

One embodiment of the method provides that the casting material is cured.

An embodiment of the method provides that the first component and the second component are charged one after the other into the mold. Subsequent introductions occur then, in each case, alternately.

An embodiment of the method provides that the first component and the second component are charged into the mold at essentially the same time.

An embodiment of the method provides that the first component and/or the second component is/are charged into the mold in layers.

An embodiment of the method provides that the first component and the second component are charged alternatingly into the mold in predeterminable amounts.

An embodiment of the method provides that the mold is vibrated or caused to oscillate with a predeterminable frequency during the charging of at least one component of the casting material.

An embodiment of the method provides that the mold is vibrated or caused to oscillate with a predeterminable frequency after the complete introduction of the one component and the second component.

An embodiment of the method provides that the mold is vibrated and/or caused to oscillate with a predeterminable frequency after complete introduction of the first and second components.

An embodiment of the method provides that the first component is essentially liquid, and the second component is essentially powdered, and that the resulting casting is a ceramic.

An embodiment of the method provides that the mold is connected with a housing element of the measuring apparatus.

An embodiment of the method provides that the sensor apparatus is connected to an electronic component of the measuring apparatus.

Furthermore, the invention achieves the object by a method for casting into an at least partially pot-shaped mold, wherein the mold is filled, at least partially, with a casting material which is made up of at least a first component and a second component. In such a case, the method of the invention provides that the mold is filled with the casting material with at least the following steps: At least one predeterminable amount of the first component of the casting material is charged into the mold; at least one predeterminable amount of the second component of the casting material is charged into the mold, and the mold is vibrated and/or caused to oscillate with a predeterminable frequency.

The earlier mentioned advantages and embodiments apply correspondingly also in the case of this method of the invention.

Common to both methods is that it is thus especially possible to introduce even small amounts of a two component ceramic casting material directly into the hollow space to be filled.

An embodiment of the method provides that the casting material is cured.

An embodiment of the method provides that the first component and the second component are charged into the mold one after the other or that the first component and the second component are charged into the mold at essentially the same time.

An embodiment of the method provides that the first component and/or the second component are/is charged into the mold in layers.

An embodiment of the method provides that the first component and the second component are charged into the mold alternatingly in predeterminable amounts.

An embodiment of the method provides that the mold is vibrated and/or caused to oscillate with a predeterminable frequency during the introduction of at least one component of the casting material or that the mold is vibrated and/or caused to oscillate with a predeterminable frequency after the introduction of one component and before the introduction of the other component.

An embodiment of the method provides that the mold is vibrated and/or caused to oscillate with a predeterminable frequency after complete introduction of the first component and the second component.

BRIEF DESCRIPTION OF THE DRAWINGS

The invention will now be explained in greater detail with the aid of the appended drawing, the sole FIGURE of which shows as follows:

FIG. 1 is a cross section of a measuring device during casting.

DETAILED DISCUSSION IN CONJUNCTION WITH THE DRAWINGS

FIG. 1 shows a thermometer as an example of a measuring device to be manufactured; i.e., the process variable, temperature, is determined, respectively, monitored. Sensor element 1 is, for example, a thin film sensor, which is protected from the process conditions by a corresponding housing. For this, the sensor element 1 is installed in a casing, which according to the invention also serves as mold 2. The casting of the invention can remain in the mold 2 after the manufacturing process, as in the case shown here, or the mold 2 can be removed after the curing of the casting, or even earlier, depending on stability. In the mold 2, both components 3, 4 have been charged in layers, preferably with the liquid component having been charged first. In such a case, the mold 2 is continuously vibrated while filling. That means, in the practical implementation, that there would no longer be the separation of layers shown here.

Sensor element 1 is connected to an electronic component 6 of the measuring device, wherein the electronic component 6 serves for example, for processing the measured value from the sensor element 1. Since mold 2 is here a component of the measuring device, mold 2 will be connected with the housing element 5 of the device in a next step.

Thus, the method of the invention provides, for the manufacture of a measuring apparatus, or the filling of a mold with a casting material, that the components that form the casting material are charged either one after the other or at essentially the same time into the mold, and that during, or at least partially during, the charging, the mold and the provided casting material components are subjected to mechanical movements.

The invention claimed is:

1. A method for manufacturing a measuring apparatus for determining and/or monitoring at least one process variable, wherein at least one sensor element is installed into a casing, which is at least partially filled with a casting material composed of at least a first component and a second component, said method comprising:

the at least one sensor element is inserted in said casing serving as a mold for said casting material;

at least one predeterminable amount of the first component of the casting material is charged into the mold;

at least one predeterminable amount of the second component of the casting material is charged into the mold;

the first component and the second component are charged one after the other into the mold; and the mold is vibrated and/or caused to oscillate with a predeterminable frequency, such that the first component and the second component of the casting material are mixed together directly in a volume, of the mold, that is to be filled and, the casting material is cured in the mold, wherein:

said first component being liquid, said second component being powdered, said casting filled into said volume hardens by curing, and the resulting casting is a ceramic.

2. The method as claimed in claim 1, wherein:
the first component and/or the second component are/is charged into the mold in layer form.

3. The method as claimed in claim 1, wherein:
the first component and the second component are charged into the mold alternatingly in predeterminable amounts.

4. The method as claimed in claim 1, wherein:
the mold is vibrated and/or caused to oscillate with a predeterminable frequency during charging of at least one component of the casting material.

5. The method as claimed in claim 1, wherein:
the mold is vibrated and/or caused to oscillate with a predeterminable frequency after charging of one component and before charging of the other component.

6. The method as claimed in claim 1, wherein:
the mold is vibrated and/or caused to oscillate with a predeterminable frequency after complete charging of the first component and the second component.

7. The method as claimed in claim 1, wherein:
the mold is connected to a housing element of the measuring apparatus.

8. The method as claimed in claim 1, wherein:
the sensor element is connected to an electronic component of the measuring apparatus.

\* \* \* \* \*